United States Patent
Hu et al.

(10) Patent No.: US 7,272,198 B1
(45) Date of Patent: *Sep. 18, 2007

(54) METHOD AND APPARATUS FOR COMPLEMENTARY CODE KEYING

(75) Inventors: Guorong Hu, Sunnyvale, CA (US); Yungping Hsu, Cupertino, CA (US); Weishi Feng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/525,327

(22) Filed: Sep. 22, 2006

Related U.S. Application Data (63) Continuation of application No. 10/092,971, filed on Mar. 5, 2002, now Pat. No. 7,145,969.

(60) Provisional application No. 60/277,258, filed on Mar. 21, 2001.

(51) Int. Cl.
*H03D 1/00* (2006.01)
*H04L 27/06* (2006.01)

(52) U.S. Cl. ............ 375/343; 375/342; 375/341; 455/114.3; 455/114.2

(58) Field of Classification Search ......... 375/343, 375/233, 232, 148, 222, 376, 340, 341, 336, 375/321, 296, 297; 370/335, 252; 455/522, 455/114.3, 91, 114.2, 126; 330/149
See application file for complete search history.

(56) References Cited

U.S. PATENT DOCUMENTS

| | | | |
|---|---|---|---|
| 5,579,345 A * | 11/1996 | Kroeger et al. ............ 375/344 |
| 5,615,230 A | 3/1997 | Gunther et al. | |
| 5,636,247 A | 6/1997 | Kamerman et al. | |
| 5,719,867 A * | 2/1998 | Borazjani ............ 370/436 |
| 5,768,323 A * | 6/1998 | Kroeger et al. ............ 375/355 |
| 5,841,813 A | 11/1998 | Van Nee | |
| 5,841,816 A * | 11/1998 | Dent et al. ............ 375/331 |
| 5,862,182 A | 1/1999 | Awater et al. | |
| 5,878,085 A | 3/1999 | McCallister et al. | |
| 5,966,055 A | 10/1999 | Knoedl, Jr. et al. | |
| 6,005,840 A | 12/1999 | Awater et al. | |
| 6,233,273 B1 * | 5/2001 | Webster et al. ............ 375/148 |
| 6,330,273 B1 | 12/2001 | Hulbert et al. | |
| 6,345,067 B1 | 2/2002 | Okamoto | |
| 6,345,073 B1 | 2/2002 | Curry et al. | |
| 6,347,112 B1 | 2/2002 | Lattard et al. | |

(Continued)

OTHER PUBLICATIONS

TA Wilkinson, AE Jones, "Minimization of the Peak to Mean Envelope Power Ratio of Multicarrier Transmission Schemes By Block Coding," VTC Chigago, Jul. 1995, 1995 IEEE.

(Continued)

*Primary Examiner*—Mohammed Ghayour
*Assistant Examiner*—Qutub Ghulamali (57) ABSTRACT

A method of decoding data includes receiving a symbol and determining a data rate that was used to encode the symbol. A set of correlator output signals are generated based on a first mode when a first data rate was used to encode the symbol and based on a second mode when a second data rate was used to encode the symbol. A maximum-valued signal in one of the set of correlator output signals is identified. The maximum-valued signal in one of the set of correlator output signals is modulated.

21 Claims, 10 Drawing Sheets

U.S. PATENT DOCUMENTS

| | | |
|---|---|---|
| 6,363,104 B1 | 3/2002 | Bottomley |
| 6,697,350 B2* | 2/2004 | Lomp ......................... 370/342 |
| 2001/0034254 A1* | 10/2001 | Ranta ......................... 455/574 |
| 2003/0012267 A1* | 1/2003 | Jitsukawa et al. .......... 375/148 |
| 2003/0067904 A1* | 4/2003 | Nagatani et al. ............ 370/342 |

OTHER PUBLICATIONS

Robert L. Frank, "Polyphase Complementary Codes," IEEE Transactions on Information Theory, vol. 26, Nov. 1980.

R. Sivaswamy, "Multiphase Complementary Codes," IEEE Transactions on Information Theory, vol. 24, No. 5, Sep. 1978.

Marcel J. E. Golay, "Complementary Series," IRE Transactions on Information Theory April.

Carl Andren, Mark Webster, "CCK Modulation Delivers 11Mbps for High Rate IEEE 802.11 Extension," Wireless Symposium/Portable by Design Conference Spring 1999.

IEEE Std 802.11b-1999, The Institute of Electrical and Electronics Engineers, Inc. New York, 2000.

Bob Pearson, "Complementary Code Keying Made Simple," Intersil, Application Note Nov. 2001 AN9850.

* cited by examiner

METHOD AND APPARATUS FOR COMPLEMENTARY CODE KEYING

CROSS-REFERENCE TO RELATED APPLICATIONS

This application is a continuation of U.S. patent application Ser. No. 10/092,971, filed Mar. 5, 2002 now U.S. Pat. No. 7,145,969 which claims priority under 35 U.S.C. § 119 (e) of U.S. Provisional Patent Application Ser. No. 60/277,258, filed on Mar. 21, 2001, the contents of each of which are hereby incorporated by reference.

BACKGROUND

1. Technical Field

This invention relates generally to wireless local area networks, and more particularly, to wireless local area networks employing physical layer modulation and demodulation in accordance with IEEE802.11b.

2. Related Art

There are several known techniques for transmitting digital waveforms across wireless networks. One known technique is direct sequence spread spectrum (DSSS), which allows for high-rate modulation using complementary codes known as "spreading codes." The use of spreading codes enables the bandwidth occupied by a DSSS waveform to be increased or "spread." As a consequence of this bandwidth spreading (and despreading), DSSS systems are able to realize processing gains compared to systems using other transmission techniques.

Complementary Code Keying (CCK) is the modulation technique chosen for IEEE 802.11b high rate modes (5.5 Mbps mode and 11 Mbps mode). For example, a CCK modulated symbol c may be expressed as:

$$c = \{e^{j(\phi_1+\phi_2+\phi_3+\phi_4)}, e^{j(\phi_1+\phi_3+\phi_4)}, -e^{j(\phi_1+\phi_2+\phi_4)}, e^{j(\phi_1+\phi_4)}, e^{j(\phi_1+\phi_2+\phi_3)}, e^{j(\phi_1+\phi_3)}, -e^{j(\phi_1+\phi_2)}, e^{j\phi_1}\} \quad (1)$$

where $v_1$, $v_2$, $v_3$ and $v_4$ are suitable phase values as described in more detail below.

For clarity of description, the chips in equation (1) are hereinafter referenced from left to right as c0–c7, respectively. In CCK modulation, the 4th and 7th chips, namely c3 and c6, are rotated 180° to optimize the correlation properties and reduce DC offset.

When operating in the 5.5 Mbps CCK mode (4 bits/symbol), the various phase values $v_1$, $v_2$, $v_3$ and $v_4$ employed in equation (1) are defined as shown below in equation (2).

$$\begin{cases} \varphi_1 = DQPSK \text{ encode with}(d0, d1) \text{ and even/odd} \\ \varphi_2 = (d2*2+1)*\pi/2 \\ \varphi_3 = 0 \\ \varphi_4 = d3*2*\pi/2 \end{cases} \quad (2)$$

where d0, d1, d2 and d3 are the 4 bits to be modulated.

When operating in the 11 Mbps CCK mode (8 bits/symbol), the various phase values are defined as shown below in equation (3).

$$\begin{cases} \varphi_1 = DQPSK \text{ encode with}(d0, d1) \text{ and even/odd} \\ \varphi_2 = (d2*2+d3)*\pi/2 \\ \varphi_3 = (d4*2+d5)*\pi/2 \\ \varphi_4 = (d6*2+d7)*\pi/2 \end{cases} \quad (3)$$

where d0, d1, . . . , d6 and d7 are the 8 bits to be modulated.

When demodulating, the d2–d3 bits (5.5 Mbps mode) or the d2–d7 bits (11 Mbps mode) will be decoded by the CCK correlator, and d0–d1 by DQPSK demodulation.

The published CCK 64-vector correlation can be written as:

$$R = C^T \begin{bmatrix} e^{j(\varphi_2+\varphi_3+\varphi_4)} \\ e^{j(\varphi_3+\varphi_4)} \\ e^{j(\varphi_2+\varphi_4)} \\ e^{j\varphi_4} \\ e^{j(\varphi_2+\varphi_3)} \\ e^{j\varphi_3} \\ e^{j\varphi_2} \\ 1 \end{bmatrix}^* =$$

$$C^T \begin{bmatrix} e^{j\varphi_2} & & & \\ & 1 & & \\ & & e^{j\varphi_2} & \\ & & & 1 & e^{j\varphi_2} \\ & & & & 1 & e^{j\varphi_2} \\ & & & & & 1 \end{bmatrix}^* \begin{bmatrix} e^{j\varphi_3} & \\ & 1 & e^{j\varphi_3} \\ & & 1 \end{bmatrix}^* \begin{bmatrix} e^{j\varphi_4} \\ 1 \end{bmatrix}^*$$

where $C^T=(c0, c1, c2, -c3, c4, c5, -c6, c7)$ (In-phase and Quadrature signal).

Figure 1:
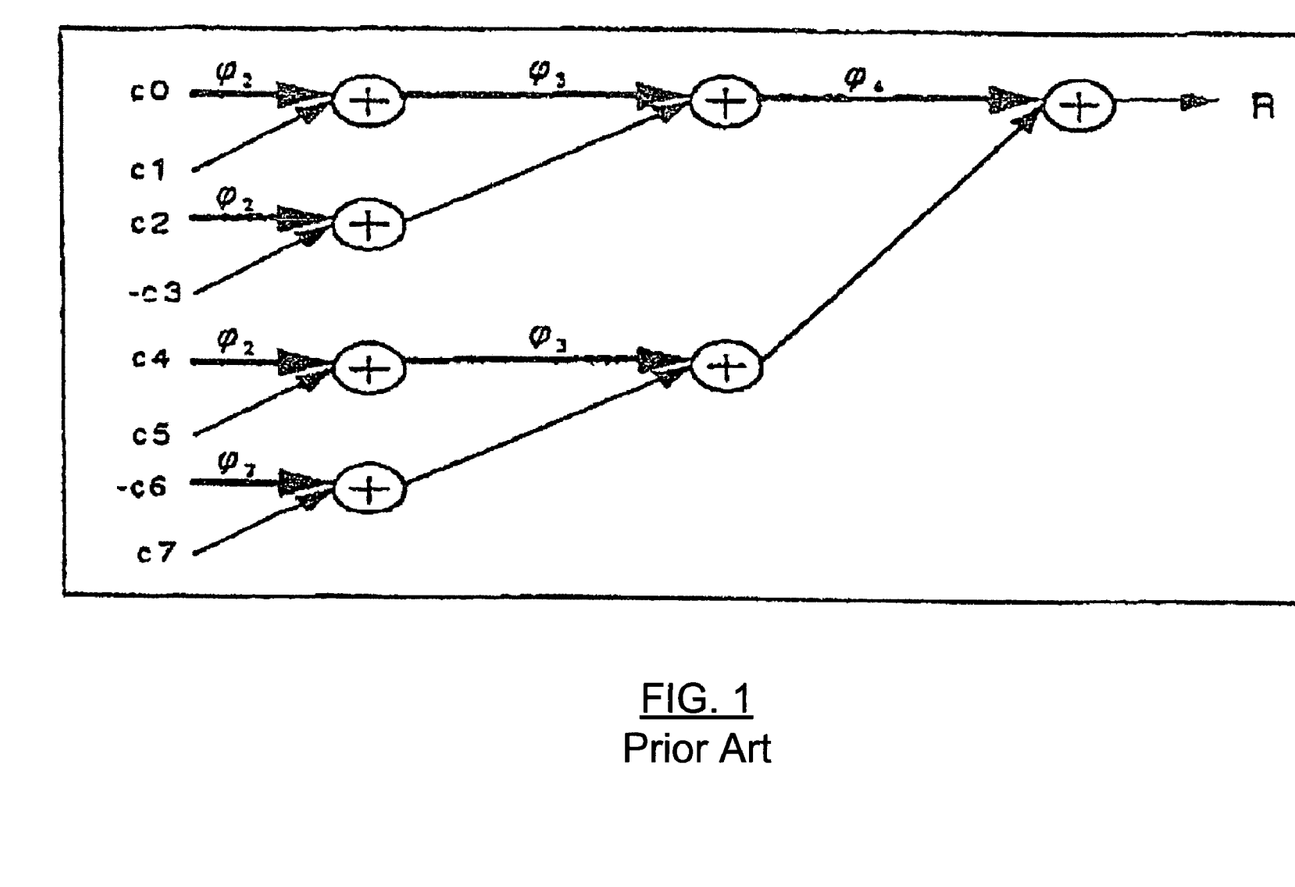
FIG. 1 shows a single vector CCK correlator of the prior art.

FIG. 1 depicts a CCK correlator architecture of the prior art. Only one phase or vector is shown for each of the v values. It should be appreciated that the CCK correlator architecture depicted in FIG. 1 is capable of operating at either of 5.5 Mbps mode or 11 Mbps mode. As such, the actual hardware implementation and the time cost for both 5.5 Mbps and 11 Mbps modulation are the same, and therefore the power consumption is the same. In 5.5 Mbps modulation mode, $v_3$ is always equal to zero (see equation (2) above). Because the amount of real vector used for 5.5 Mbps modulation is less than the amount used for 11 Mbps modulation, the prior correlator wastes substantial power when operating at 5.5 Mbps and consumes as much power as is required for 11 Mbps operation.

SUMMARY

The present invention relates to a method and apparatus for a CCK correlator employing a reduced power consumption and achieves faster performance in the 5.5 Mbps mode of operation as compared with the 11 Mbps mode of operation.

An apparatus and method for decoding CCK-encoded data that has been encoded at one of first and second differing data rates is described. In one embodiment of the present invention, a CCK demodulator receives a symbol, determines based upon an indication contained with the data header whether the symbol was encoded at the first or second data rate, e.g. 5.5 Mbps or 11 Mbps, applies the symbol to a correlator to generate a set of correlator outputs based on the rate at which the symbol was encoded, identifies the maximum-valued correlator output signal, and demodulates the maximum-valued one of the correlator output signals to yield the CCK encoded data. The symbol preferably comprises eight complex chips. Further, the correlator comprises a phase rotator which rotates if the data was modulated at the higher data rate, e.g. 11 Mbps. Still further, the phase rotator is rotated through a predetermined number of phases, wherein the predetermined number is preferably four. The number of correlator output signals is dependent upon whether the data was encoded at the first or second data rate. After determining the maximum-valued correlator output signal, certain data bits are preferably decoded through the use of a look-up table. Some data bits are preferably decoded through the use of a DQPSK demodulator. The demodulator preferably determines if the data was encoded at the first or second data rate, e.g., 5.5 Mbps or 11 Mbps, based on information contained in the header of the encoded data.

DETAILED DESCRIPTION

Figure 2:
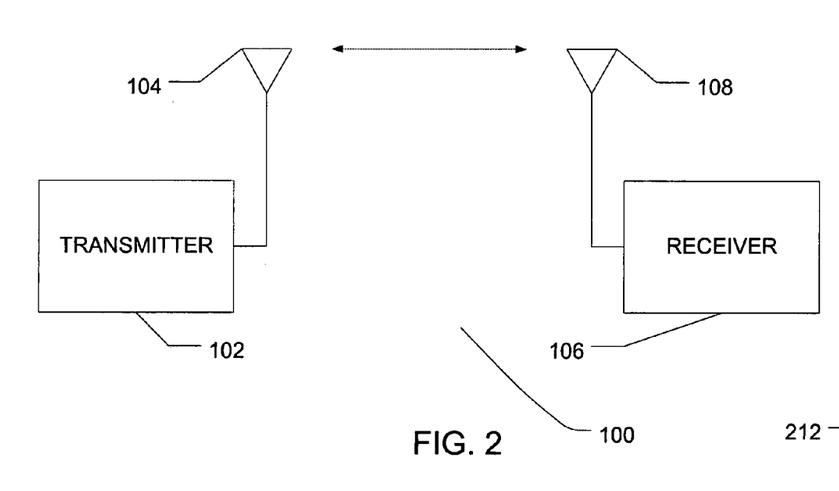
FIG. 2 shows one exemplary operating environment of the present invention.

An exemplary operating environment for the illustrated system of the present invention is depicted in FIG. 2. Specifically, FIG. 2 depicts a wireless local area network 100 according to the present invention. A transmitter 102, an antenna 104, a receiver 106 and an antenna 108 are depicted. The transmitter 102 provides the data that is to be transmitted across antenna 104 to the receiver 106. The receiver 106 receives the transmitted data via antenna 108.

Figure 3:
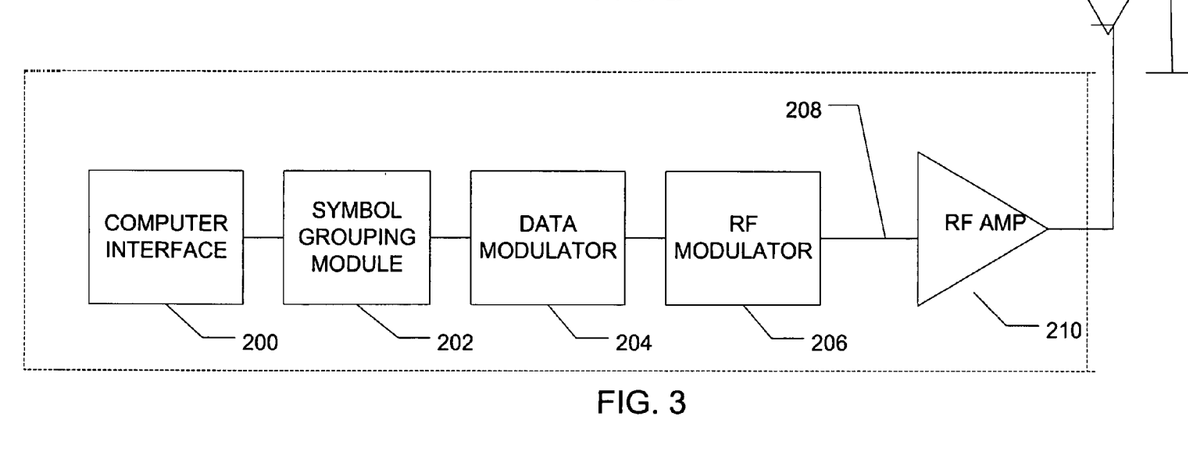
FIG. 3 shows one exemplary embodiment of a data transmitter used in accordance with the present invention.

FIG. 3 depicts the transmitter 102 (FIG. 2) according to one embodiment of the present invention. Referring to FIG. 3, a computer interface 200, a symbol grouping module 202, a data modulator 204, a radio frequency modulator 206, a radio frequency signal 208, a radio frequency amplifier 210, and an antenna 212 are shown. The computer interface 200 provides a stream of binary data which represents information to be modulated and transmitted across the wireless local area network 100 (FIG. 2). The symbol grouping module 202 receives the stream of binary data from the computer interface 200 and divides the stream into a series of data words, with each data word representing a symbol value. The symbol values or data words from the grouping module 202 are then passed to the data modulator 204. The data modulator 204 modulates the data words into CCK modulated data that is compliant with the IEEE802.11b specifications. The CCK modulated data is then directed to the radio frequency (RF) modulator 206 which converts the CCK modulated data into a radio frequency signal. The radio frequency signal 208 is amplified by the radio frequency amplifier 210 such that it may be transmitted by antenna 212 as packets of data 214 (represented by an arrow in FIG. 3).

Figure 4:
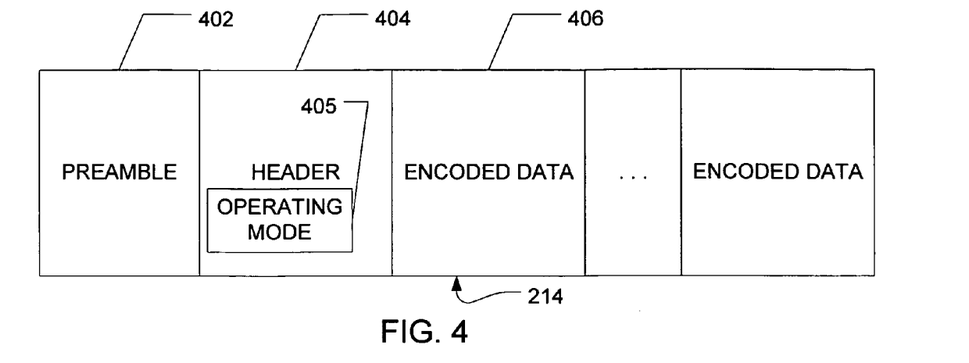
FIG. 4 shows one exemplary data structure used in accordance with the principles of the present invention.

Referring to FIG. 4, the packets of data 214 that are transmitted by the antenna 212 contain a preamble 402, a header 404, an operating mode indicator 405, and encoded data 406. The operating mode indicator 405, contained within the header 404, is an indication of whether the operating mode is DSSS 1 Mbps, DSSS 2 Mbps, CCK 5.5 Mbps or CCK 11 Mbps mode.

Encoding Data

Figure 5:
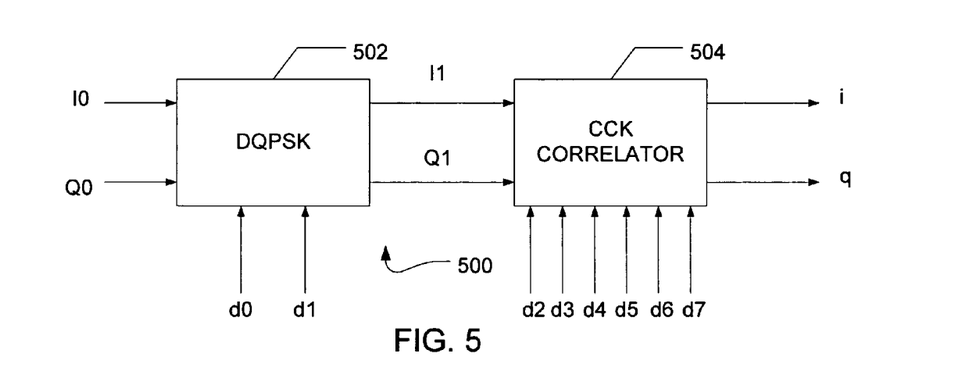
FIG. 5 shows an exemplary data encoding structure for use in accordance with the principles of the present invention.

Referring to FIG. 5, a CCK encoder 500 according to one exemplary embodiment of the present invention is depicted. The CCK encoder 500 includes a differential quadrature phase shift key (DQPSK) modulator 502 and a CCK correlator 504. The computer interface 200 (FIG. 3) outputs data bits d0-d3 (in 5.5 Mbps mode) or d0-d7 (in 11 Mbps mode). Regardless of whether the encoder 500 is operating in 5.5 Mbps mode or 11 Mbps mode, d0 and d1 are applied to the DQPSK modulator to encode the phase parameter $v_1$. DQPSK is well-known in the art. The phase parameter $v_1$ is determined based on the data bits d0 and d1 according to the table below:

| (d1, d0) | Phase (even symbols) | Phase (odd symbols) |
| --- | --- | --- |
| 00 | 0 | B |
| 01 | B/2 | −B/2 |
| 10 | −B/2 | B/2 |
| 11 | B | 0 |

Data bits d2-d3 (5.5 Mbps) or d2-d7 (11 Mbps) are applied to the CCK correlator 504. The CCK correlator 504 receives the appropriate data bits (d2-d3 or d2-d7) and encodes the phase parameters $v_2$, $v_3$ and $v_4$ according to equation (2) or equation (3), respectively.

An even/odd rotator (not shown) may be utilized in the encoder 500 to output a signal that toggles between two different states. For even symbols, no rotation is applied to the phase value. For odd symbols, an additional rotation of B is applied to the phase value. By additionally encoding data with such a signal, effects of DC offset are reduced because any encoded symbol will have been encoded with a different odd/even status from the immediately preceding and following encoded symbols.

After the data bits have been applied to the CCK encoder 500, all of the phase parameters $v_1$, $v_2$, $v_3$ and $v_4$ will have been encoded. With all of the phase parameters thus being known, the phase parameter values may then be substituted into equation (1) to yield the eight-chip symbol. It should be noted that the symbol will contain eight complex chips, regardless of whether four data bits (5.5 Mbps) or eight data bits (11 Mbps) are used. The eight-chip symbol is then RF modulated by RF modulator 206, amplified by RF amplifier 210, and transmitted from antenna 212 (FIG. 3).

Encoding Example

As an example, if the CCK modulator 500 is operating in 5.5 Mbps mode and receives four data bits d3-d0 (MSB to LSB) {1, 0, 0, 1}, the output of the DQPSK modulator 502 will be B/2, and therefore $v_1$=B/2. $v_2$ is equal to (d2*2+1)*B/2 or (0*2+1)*B/2 which equals B/2. $v_3$ is defined as 0 in 5.5 Mbps mode. Finally, $v_4$ is equal to d3*2*B/2 or B. Thus {$v_1$, $v_2$, $v_3$, $v_4$} equals {B/2, B/2, 0, B}. Substituting those values into equation (1) yields the symbol c={$e^{j2B}$, $e^{jB/2}$, $e^{j2B}$, $-e^{j3B/2}$, $e^{jB}$, $e^{j3B/2}$, $-e^{jB}$, $e^{jB/2}$}. Euler's formula is provided below in equation (4):

$$e^{j\theta} = \cos\theta + j\sin\theta \quad (4)$$

Substituting the complex chip values for c (shown above) into equation (4) yields the complex symbol c={1, −j, 1, j, −1, −j, 1, j}. Thus it is apparent that any symbol to be transmitted may be derived through the use of the above equations.

Decoding Data

Figure 6:
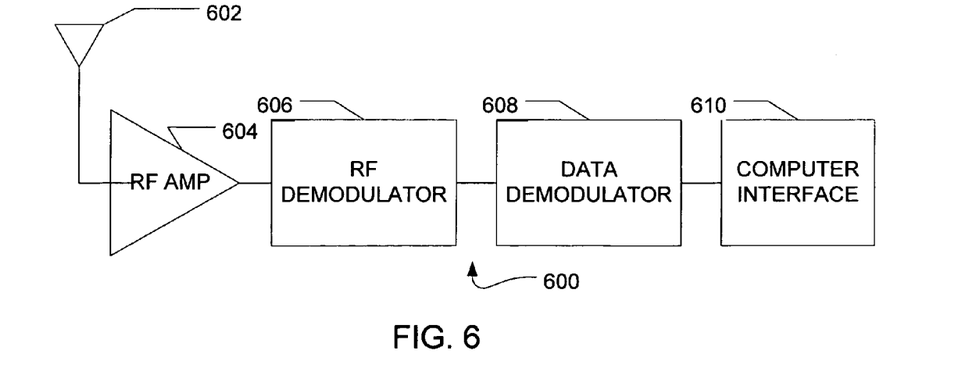
FIG. 6 shows one exemplary embodiment of a data receiver for use in accordance with the principles of the present invention.

FIG. 6 illustrates one exemplary embodiment of a receiver 600 (receiver 106 in FIG. 2) in accordance with the principles of the present invention. The receiver 600 includes an antenna 602, an RF amplifier 604, an RF demodulator 606, a data demodulator 608, and a computer interface 610. The encoded data packets transmitted by the antenna 212 (FIG. 3) are received by the antenna 602. The encoded data packets are applied to the RF amplifier 604 and the RF demodulator 606 to restore the data packets to a baseband signal. The data packets are then demodulated by the data demodulator 608 so that the original data from the computer interface 200 may be recovered.

Figure 7:
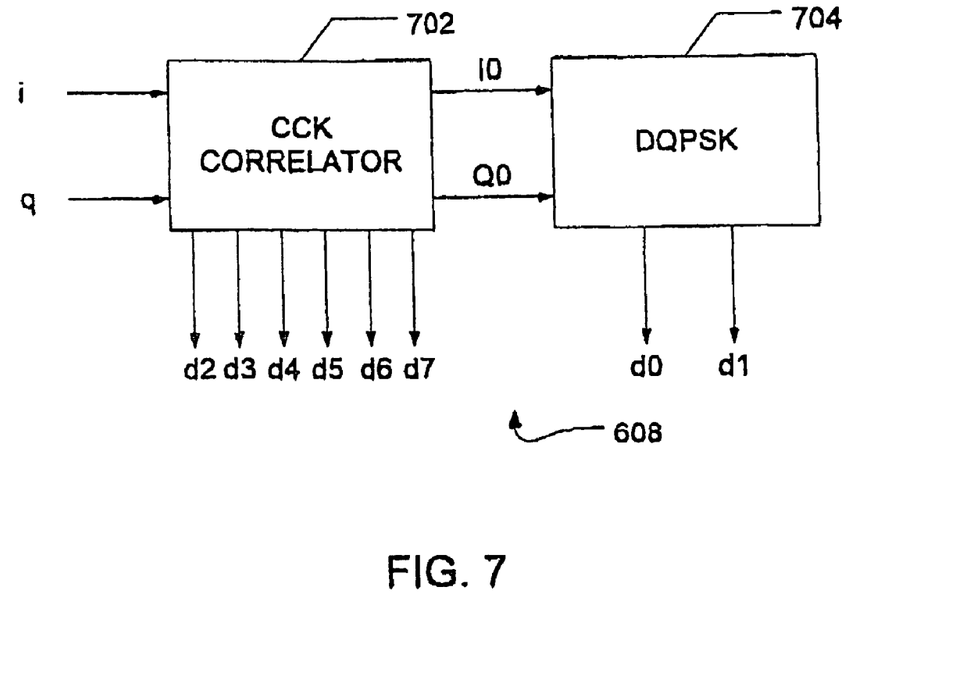
FIG. 7 shows data decoding structure for use in accordance with the principles of the present invention.

Referring to FIG. 7, one exemplary embodiment of the data demodulator 608 (FIG. 6) is shown in further detail. The data demodulator 608 includes a CCK 64-vector correlator 702 and a DQPSK demodulator 704. The CCK 64-vector correlation implemented by the illustrated CCK correlator 702 can be written as:

$$R = \begin{bmatrix} c0 \\ c1 \\ c2 \\ -c3 \\ c4 \\ c5 \\ -c6 \\ c7 \end{bmatrix}^T \begin{bmatrix} e^{j(\varphi_2+\varphi_3+\varphi_4)} \\ e^{j(\varphi_3+\varphi_4)} \\ e^{j(\varphi_2+\varphi_4)} \\ e^{j\varphi_4} \\ e^{j(\varphi_2+\varphi_3)} \\ e^{j\varphi_3} \\ e^{j\varphi_2} \\ 1 \end{bmatrix}^* = \begin{bmatrix} c0 \\ c2 \\ c1 \\ -c3 \\ c4 \\ -c6 \\ c5 \\ c7 \end{bmatrix}^T \begin{bmatrix} e^{j(\varphi_2+\varphi_3+\varphi_4)} \\ e^{j(\varphi_2+\varphi_4)} \\ e^{j(\varphi_3+\varphi_4)} \\ e^{j\varphi_4} \\ e^{j(\varphi_2+\varphi_3)} \\ e^{j\varphi_2} \\ e^{j\varphi_3} \\ 1 \end{bmatrix}^* \quad (5)$$

The correlator output R may be expanded as shown below:

$$R = \begin{bmatrix} c0 \\ c2 \\ c1 \\ -c3 \\ c4 \\ -c6 \\ c5 \\ c7 \end{bmatrix}^T \begin{bmatrix} e^{j\varphi_3} & & & \\ 1 & & & \\ & e^{j\varphi_3} & & \\ & 1 & & \\ & & e^{j\varphi_3} & \\ & & 1 & \\ & & & e^{j\varphi_3} \\ & & & 1 \end{bmatrix} \left( \begin{bmatrix} e^{j\varphi_2} & \\ 1 & e^{j\varphi_2} \\ & 1 \end{bmatrix} \begin{bmatrix} e^{j\varphi_4} \\ 1 \end{bmatrix}^* \right)^*$$

Figure 8:
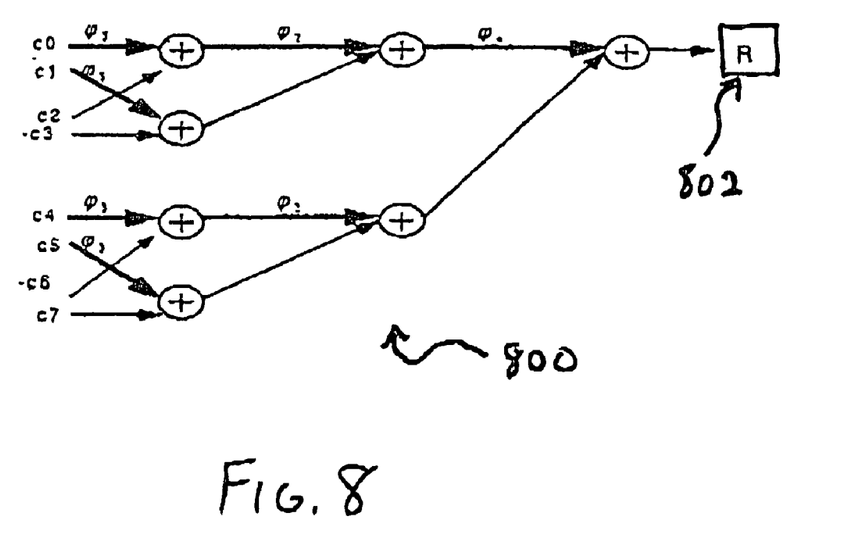
FIG. 8 shows a single-vector CCK correlator for use in accordance with one exemplary embodiment of the present invention.

A single-vector implementation of the CCK correlator described above is depicted in FIG. 8. It should be appreciated that because the correlator 800 depicted in FIG. 8 is a single-vector correlator, application of a particular combination of phase parameters $v_2$, $v_3$ and $v_4$ to the correlator 800 will yield a single output value R of the set of 64 possible correlator outputs values 802.

Figure 9:
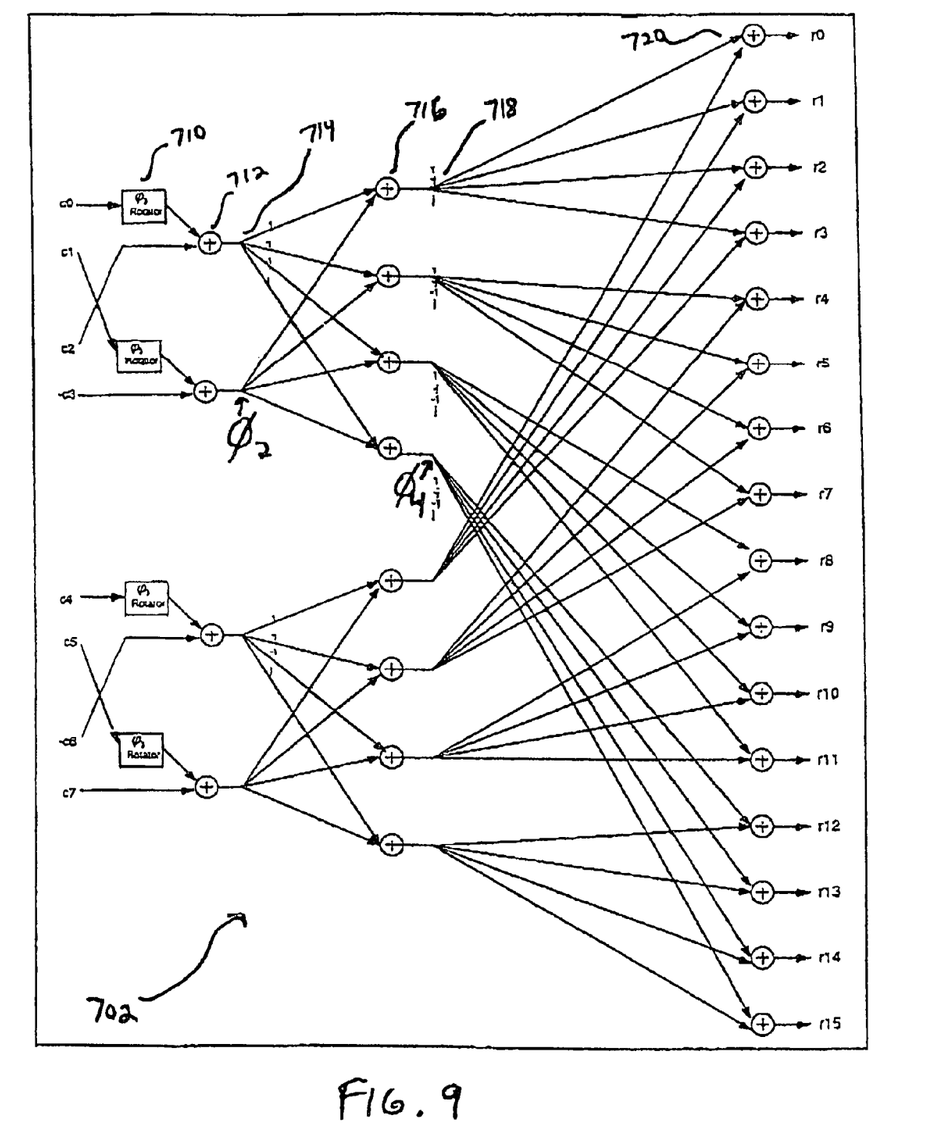
FIG. 9 shows a 64-vector CCK correlator for use in accordance with one exemplary embodiment of the present invention.

One exemplary embodiment of the 64-vector CCK correlator 702 according to the present invention is depicted in FIG. 9. The received symbol c, made up of chips c0-c7, is applied to the input of the correlator 702. It should be appreciated that, through the use of four different vector values for each of the phase parameters $v_2$, $v_3$ and $v_4$, 64 different correlator output values are possible (4*4*4=64). $v_3$ Rotator 710 is provided to rotate or cycle through the four possible values that $v_3$ may assume. Of course, it should be appreciated that $v_3$ may only assume four possible values when operating in 11 Mbps mode; in 5.5 Mbps mode, $v_3$ is fixed at a value of 0. Two terms are summed at summers 712. For example, a $v_3$-rotated value of c0 (i.e., c0*e^j$v_3$) is summed with c2, a $v_3$-rotated value of c1 is summed with −c3, etc. At 714, the four possible vectors of $v_2$ (1, −j, −1, j) are applied to the output of the summers 712. Two terms corresponding to $v_2$ and $v_3$ that have been decomposed according to equation (5) are summed at summers 716. At 718, the four possible vector values of $v_4$ are applied to modify the outputs 718 of the summers 716. Finally, two terms corresponding to $v_2$, $v_3$ and $v_4$ that have been decomposed according to equation (5) are summed at summers 720. The output of the various summers 720 correspond to correlator outputs r0-r15 (i.e. outputs 722). Thus, for any given value of $v_3$, there will be sixteen possible correlator outputs 722 with an index [$v_2$, $v_4$].

When the correlator 702 is operating in 11 Mbps mode, four clock cycles will be required in order to generate the 64 possible outputs 722, i.e. 16 outputs 722 per clock cycle, with the $v_3$ Rotators 710 rotating once per clock cycle. When the correlator 702 is operating in the 5.5 Mbps mode, however, only one clock cycle will be required to generate all available outputs 722. This is because, in the 5.5 Mbps mode, $v_3$ may only assume the value 0, such that there is no need to rotate through other possible vector values. As a consequence of the correlator design of the present invention, the amount of power required for demodulating while operating at 5.5 Mbps is greatly reduced compared to the prior art correlators as described above. Further, the correlator of the present invention is appreciably faster, because there is no need to rotate through the other possible $v_3$ values.

Figure 10:
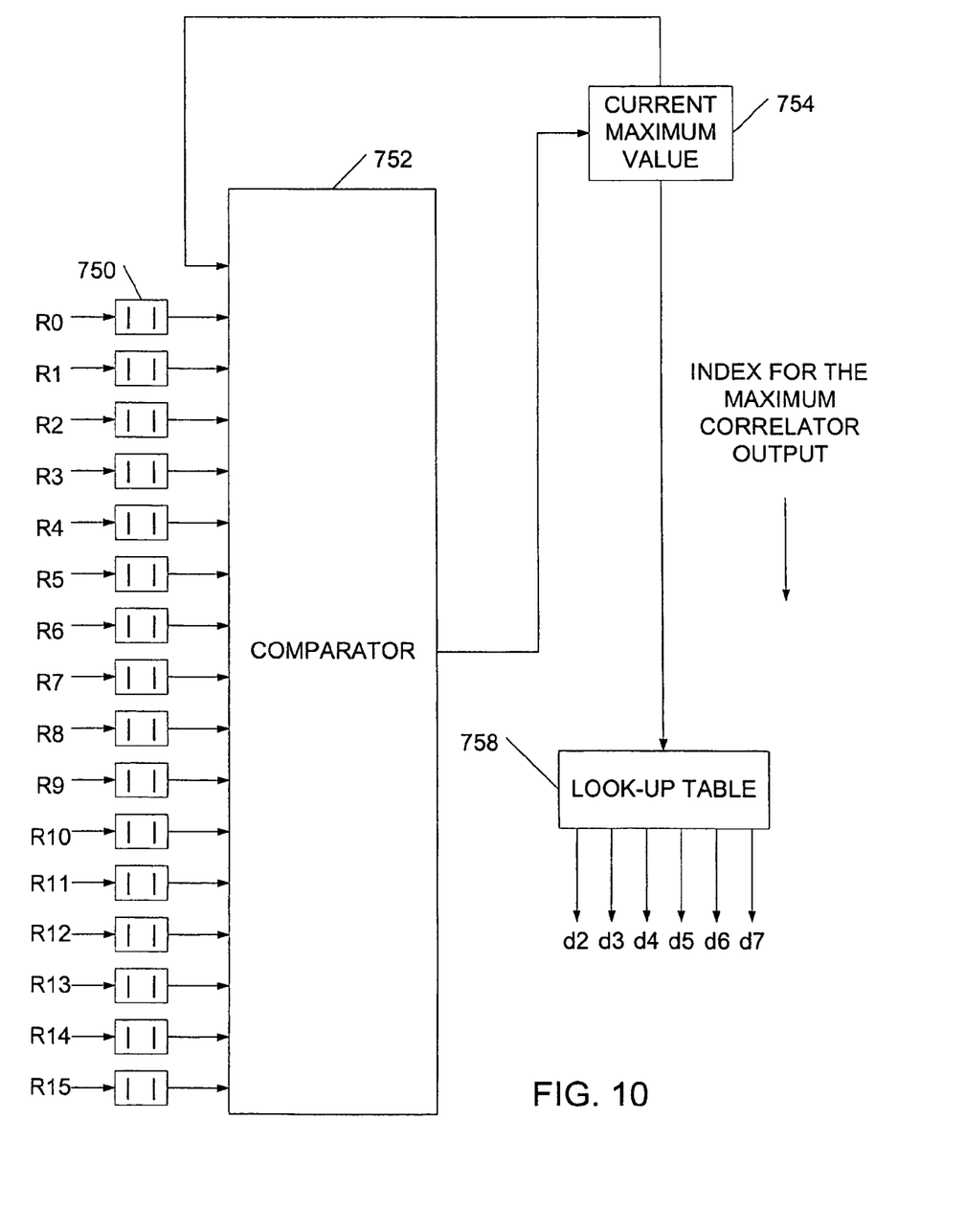
FIG. 10 shows structure for use in demodulating to recover at least some original data bits according to one exemplary embodiment of the present invention.

The correlator outputs 722 are analyzed to determine which of the outputs r0-r15 is of the greatest magnitude. Referring to FIG. 10, each of the correlator outputs 722 is applied to an absolute value module 750. The absolute value module 750 will output a value representative of the magnitude of the inputted correlator output r0-15, respectively. The maximum value is held in a current maximum value module 754. The value in the current maximum value module 754 is preferably initialized to 0 such that the actual maximum correlator output 722 for the first iteration of phase rotations will be stored. The output of each absolute value module 750 and the current maximum value held in the current maximum value module 754 are compared. Thus, in one exemplary embodiment, 17 comparisons are performed (one for each of the sixteen correlator outputs and one for the previous maximum value) for each of the four phase rotations of the $v_3$ rotator. If the correlator 702 is operating in 5.5 Mbps mode, then all of the possible correlator values will have been generated, and the maximum value of those output values will be known and stored in the current maximum value module 754. If the correlator 702 is operating in 11 Mbps mode, then $v_3$ will be rotated three times, spanning all four phase values, and the correlator 702 will generate 16 correlator output values with each rotation. Comparisons are performed for each of the rotations and the maximum value of those 64 correlator values will be stored in the current maximum value module 754. It should be appreciated by those skilled in the art that there are numerous other methods of determining the maximum value of a set of output values.

After determining the value of the maximum correlator output 722, the index of the CCK correlator 702 with a maximum value is mapped to the corresponding data values. Specifically, the original data values d2-d7 (11 Mbps) or d2-3 (5.5 Mbps) are determined through the use of an encoder, e.g. look-up table 758. Look-up table 758 outputs data bits that correspond to the correlator index that has the maximum correlator output value.

The maximum correlator output value is also used to determine data values d0-d1. This is done through DQPSK demodulation performed by DQPSK demodulation module 704 (FIG. 7).

The original data values d0-d3 (5.5 Mbps) or d0-d7 (11 Mbps) are then provided by the data demodulator 608 to the computer interface 610 (FIG. 6).

Figure 11:
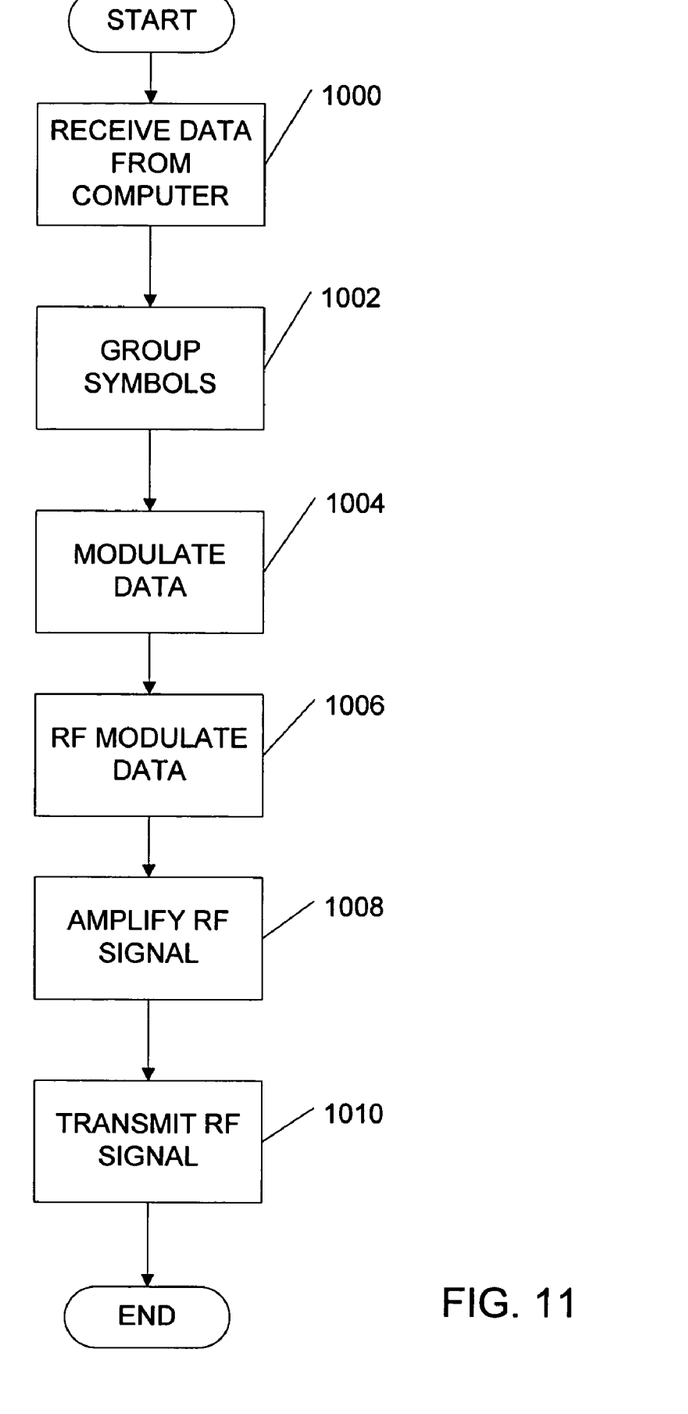
FIG. 11 shows a flow diagram depicting an exemplary transmission portion of one exemplary embodiment of the present invention.

FIG. 11 is a flow diagram depicting the transmission portion according to one embodiment of the present invention. In block 1000, data is received from a computer via the computer interface 200 (FIG. 3). The data is then grouped into symbols in block 1002 by the symbol grouping module 202 (FIG. 3). In block 1004, the data is modulated by the data modulator 204 (FIG. 3). The baseband modulated data is then RF modulated in block 1006 by the RF modulator 206 (FIG. 3). In block 1008, the RF signal is amplified by RF amplifier 210 (FIG. 3). Finally, the amplified RF signal is transmitted in block 1010 by antenna 212 (FIG. 3).

Figure 12:
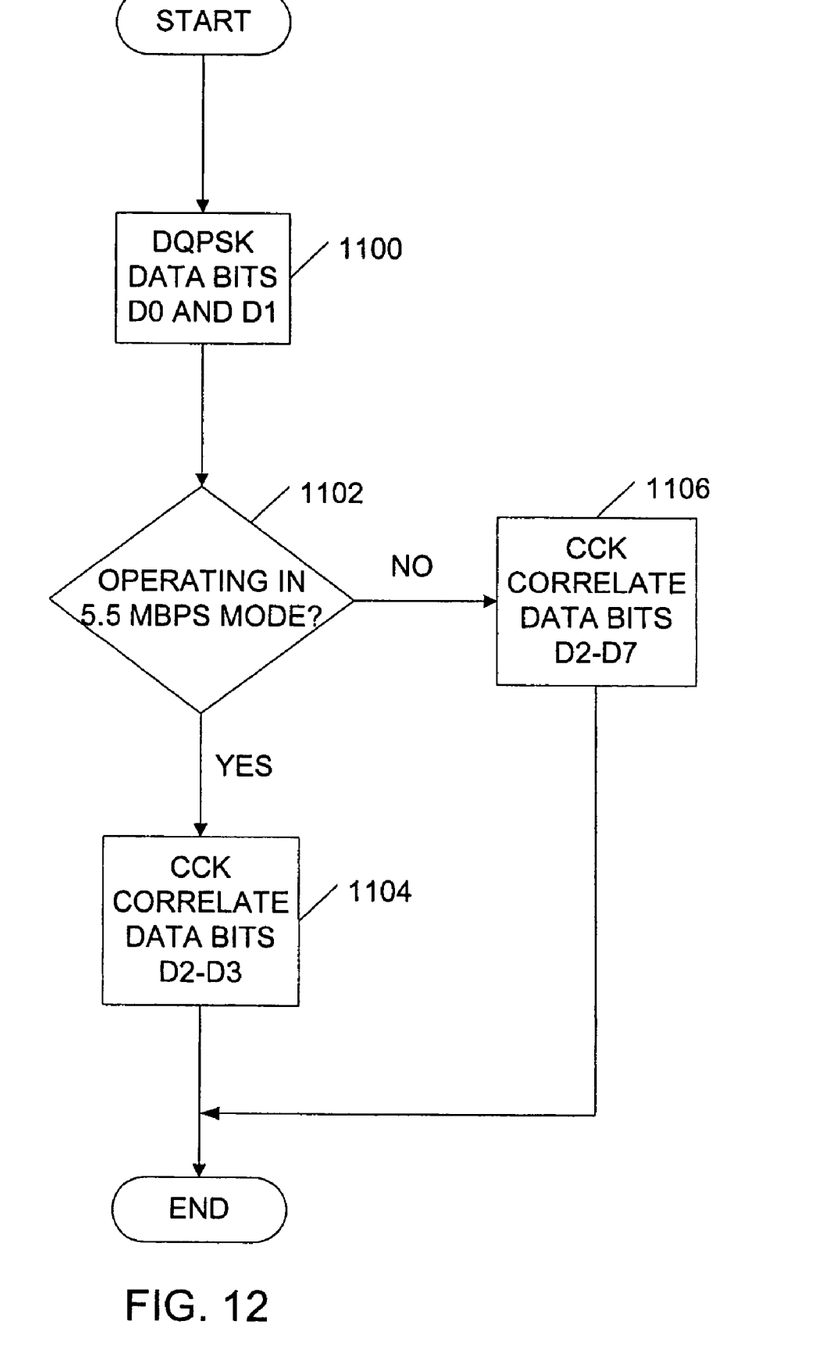
FIG. 12 shows a flow diagram depicting an exemplary encoding of data bits according to one exemplary embodiment of the present invention.

FIG. 12 is a flow diagram depicting the encoding or data modulation portion according to one exemplary embodiment of the present invention. In block 1100, data bits d0 and d1 are DQPSK encoded by the DQPSK encoder 500 (FIG. 5). A determination is then made as to whether the CCK encoder 500 is operating in 5.5 Mbps or 11 Mbps mode (block 1102.). An indication of the operating mode is stored in the header 404 (FIG. 4). If the CCK encoder 500 is operating in 5.5 Mbps mode, then, in block 1104, data bits d2-d3 are applied to the CCK correlator 504 (FIG. 5). It should be recognized that four bits are used in 5.5 Mbps encoding. If the CCK encoder 500 is operating in 11 Mbps mode, then, in block 1106, data bits d2-d7 are applied to the CCK correlator 504 (FIG. 5).

Figure 13:
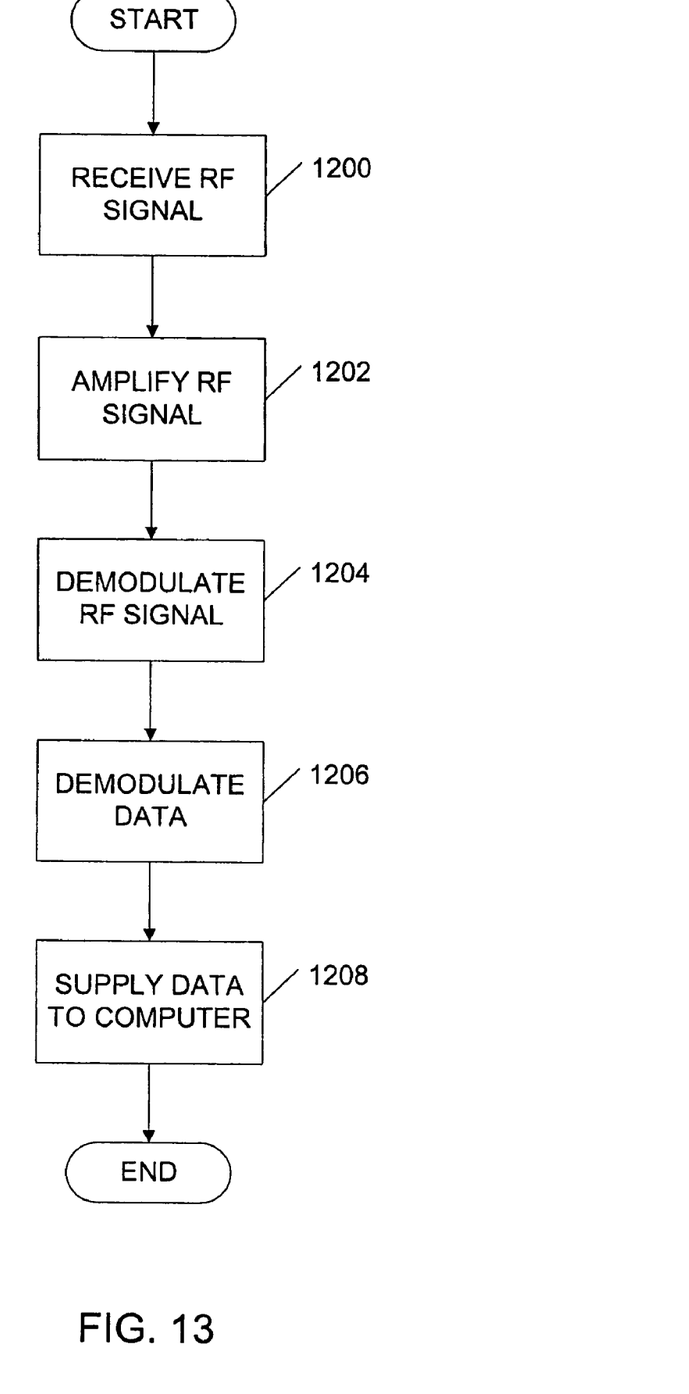
FIG. 13 shows a flow diagram depicting an exemplary receiving portion of one exemplary embodiment of the present invention.

FIG. 13 is a flow diagram depicting the receiving portion according to one embodiment of the present invention. At block 1200, the RF signal transmitted by antenna 212 (FIG. 3) is received by antenna 602 (FIG. 6). The RF signal is then amplified at block 1202 by RF amplifier 604 (FIG. 6). In block 1204, the amplified RF signal is demodulated by the RF demodulator 606 (FIG. 6). The demodulated RF signal is then in block 1206 demodulated by the data demodulator 608 (FIG. 6). In block 1208, the demodulated data is then supplied to a receiver computer (not shown) via computer interface 610 (FIG. 6).

Figure 14:
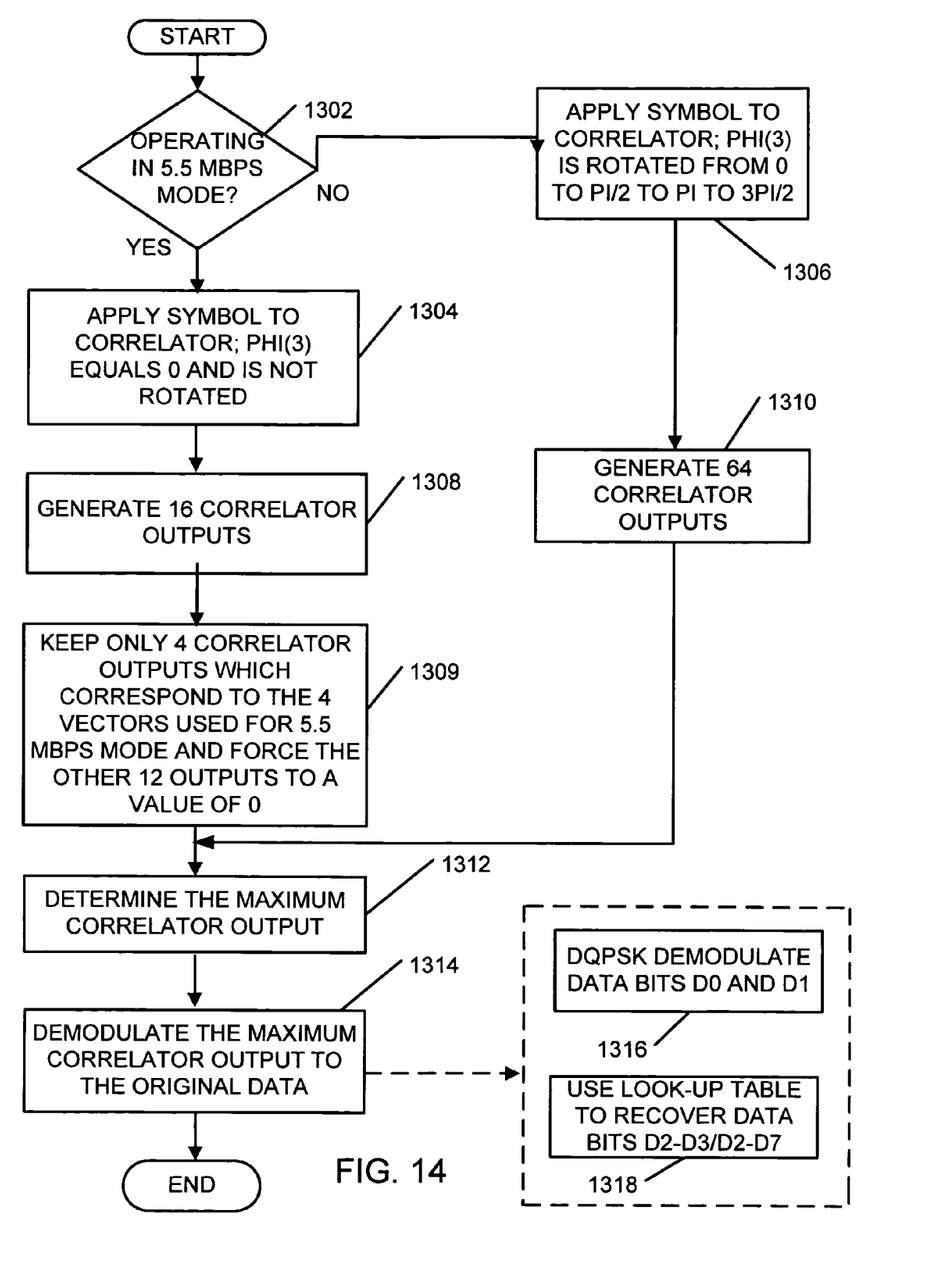
FIG. 14 shows a flow diagram depicting one exemplary approach to decoding data bits according to the principles of the present invention.

FIG. 14 is a flow diagram depicting data demodulation according to one exemplary embodiment of the present invention. In block 1302, it is determined if the data demodulator 608 (FIGS. 6-7) is operating in 5.5 Mbps or 11 Mbps mode. This is done by examining the header 404 (FIG. 4) which contains an indication of the operating mode in the operating mode indicator 405. If the data demodulator 608 is operating in 5.5 Mbps mode, then at block 1304 the received symbol is applied to the correlator 702 (FIG. 7). The $v_3$ rotator is set to output a value of 0, as $v_3$ is not rotated in 5.5 Mbps mode according to one exemplary embodiment of the present invention. The correlator 702 then generates 16 outputs (block 1308). The correlator 702 keeps only four of the outputs which correspond to the four vectors used for the 5.5 Mbps mode. The other twelve output values are forced to a value of 0 (block 1309). If, on the other hand, the data demodulator 608 is operating in 11 Mbps mode, then at block 1306 the received symbol is applied to the correlator 702 (FIG. 7). The $v_3$ rotator, however, is now set to rotate through its four values (0, B/2, B and 3B/2), so that the correlator 702 will generate 64 outputs (block 1310). Regardless of whether 16 or 64 outputs are generated (i.e., in either operating mode), at block 1312 the maximum correlator output is determined. The maximum correlator output is then demodulated to output the original data (block 1314). As shown, the demodulation of the block 1314 is performed by DQPSK demodulating the data to determine data bits d0 and d1 (block 1316) and using a look-up table to recover data bits d2-d3 (5.5 Mbps) or d2-d7 (11 Mbps) (block 1318).

It should also be appreciated by those skilled in the art that the present invention may be practiced through the use of a general purpose processor, best embodied by software.

While the present invention has been described with respect to what is presently considered to be the preferred embodiment, i.e. a method and apparatus for complementary code keying, it is to be understood that the invention is not limited to the disclosed embodiment. To the contrary, the invention is intended to cover various modifications and equivalent arrangements included within the spirit and scope of the appended claims. For example, it is to be understood that the invention is applicable to other correlator architectures in which phase rotators may selectively be used. The scope of the following claims is to be accorded the broadest interpretation so as to encompass all such modifications and equivalent structures and functions.

What is claimed is:

1. A method of decoding data comprising:
   receiving a symbol;
   determining a data rate that was used to encode the symbol;
   generating a set of correlator output signals based on a first mode when a first data rate was used to encode the symbol and based on a second mode when a second data rate was used to encode the symbol;
   identifying a maximum-valued signal in one of the set of correlator output signals; and
   demodulating the maximum-valued signal in one of the set of correlator output signals.

2. The method of claim 1, wherein the symbol comprises eight complex chips.

3. The method of claim 1, further comprising rotating a phase of the symbol to generate the set of correlator output signals if the higher of the first and second data rates was used to encode the symbol.

4. The method of claim 3, further comprising rotating a phase of the symbol to each of a predetermined number of phases.

5. The method of claim 4, wherein the predetermined number of phases is four.

6. The method of claim 1, wherein the set of correlator output signals includes a number of signals that is based on the data rate used to encode the symbol.

7. The method of claim 1, wherein demodulating the maximum-valued signal in one of the set of correlator output signals includes applying the maximum-valued one of the set of correlator output signals to a look-up table.

8. The method of claim 1, wherein demodulating the maximum-valued one of the set of correlator output signals includes applying the maximum valued signal in one of the set of correlator output signals to a differential Quadrature Phase Shift Key (QPSK) demodulator.

9. The method of claim 1, wherein the encoded data includes an indication of a data rate used to encode the symbol, and wherein determining which of the first and second data rates was used to encode the symbol comprises extracting the indication from the encoded data.

10. An apparatus for decoding data comprising:
    means for receiving a symbol;
    means for determining a data rate that was used to encode the symbol;
    means for generating a set of correlator output signals based on a first mode when a first data rate was used to encode the symbol and based on a second mode when a second data rate was used to encode the symbol;
    means for identifying a maximum-valued signal in one of the set of correlator output signals; and
    means for demodulating the maximum-valued signal in one of the set of correlator output signals.

11. The apparatus of claim 10, wherein the symbol comprises eight complex chips.

12. The apparatus of claim 10, further comprising a phase rotating means for generating the set of correlator output signals if a higher one of the first and second data rates was used to encode the symbol.

13. The apparatus of claim 12, wherein said phase rotating means includes means for rotating the phase of the symbol to each of a predetermined number of phases.

14. The apparatus of claim 13, wherein the predetermined number of phases is four.

15. The apparatus of claim 10, wherein the set of correlator output signals includes a number of signals that is based upon the data rate used to encode the symbol.

16. The apparatus of claim 10, wherein the means for demodulating the signal in one of the set of correlator output signals includes means for applying the signal in one of the set of correlator output signals to a look-up table means.

17. The apparatus of claim 10, wherein the means for demodulating the maximum valued one of the correlator output signals includes means for applying the maximum valued one of the correlator output signals to a differential Quadrature Phase Shift Key (QPSK) demodulating means.

18. The apparatus of claim 10, wherein the encoded data includes an indication of a data rate used to encode the symbol, and wherein the means for determining the data rate comprises means for extracting the indication from the encoded data.

19. An apparatus for decoding data encoded at one of first and second differing rates, comprising:
    a Complementary Code Keying (CCK) correlator that includes:
    a phase rotator; and
    a control module that selectively rotates a phase of a symbol using the phase rotator when the data has been encoded at a higher one of first and second differing rates and that does not rotate the phase when the data has been encoded at a lower one of the first and second differing rates.

20. An apparatus for Complementary Code Keying (CCK)-encoding and decoding data at one of first and second differing rates comprising:
    a differential Quadrature Phase Shift Key (QPSK) modulator;
    a first CCK correlator that receives data to be encoded;
    a second CCK correlator that receives data to be decoded and that includes:
    a maximum-value module;
    a comparator that receives an output of the maximum-value module; and
    a phase rotator that selectively rotate phase when the data has been encoded at a higher one of the first and second differing rates; and
    a differential Quadrature Phase Shift Key (QPSK) demodulator.

21. The apparatus of claim 20 further comprising:
    a first antenna;
    a radio-frequency modulator coupled to the differential QPSK modulator and the first antenna;
    a second antenna; and
    a radio-frequency demodulator that communicates with the second antenna and the differential Quadrature Phase Shift Key (QPSK) demodulator.

* * * * *

UNITED STATES PATENT AND TRADEMARK OFFICE
CERTIFICATE OF CORRECTION

PATENT NO.        : 7,272,198 B1
APPLICATION NO.   : 11/525327
DATED             : September 18, 2007
INVENTOR(S)       : Guorong Hu et al.

It is certified that error appears in the above-identified patent and that said Letters Patent is hereby corrected as shown below:

Column 1, Line 41    In Equation 1, delete "-" after "$e^{j(\varphi_2+\varphi_3+\varphi_4)}$"
                     In Equation 1 insert -- - -- before "$e^{j(\varphi_1+\varphi_4)}$"

Column 7, Line 18    Delete "r0-15" and insert -- r0-r15 --

Signed and Sealed this

Twenty-ninth Day of April, 2008

JON W. DUDAS
*Director of the United States Patent and Trademark Office*